(12) United States Patent
Du et al.

(10) Patent No.: US 10,410,374 B2
(45) Date of Patent: Sep. 10, 2019

(54) IMAGE SENSORS WITH CALIBRATED PHASE DETECTION PIXELS

(71) Applicant: SEMICONDUCTOR COMPONENTS INDUSTRIES, LLC, Phoenix, AZ (US)

(72) Inventors: Nan Du, San Jose, CA (US); David Wayne Jasinski, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 104 days.

(21) Appl. No.: 15/856,913

(22) Filed: Dec. 28, 2017

(65) Prior Publication Data

US 2019/0206086 A1 Jul. 4, 2019

(51) Int. Cl.
*G06T 7/80* (2017.01)
*G06T 7/73* (2017.01)
*G06T 3/40* (2006.01)
*H04N 5/378* (2011.01)
*H04N 5/232* (2006.01)
*G06T 1/00* (2006.01)
*G06T 7/571* (2017.01)

(52) U.S. Cl.
CPC .............. *G06T 7/80* (2017.01); *G06T 1/0007* (2013.01); *G06T 3/40* (2013.01); *G06T 7/571* (2017.01); *G06T 7/73* (2017.01); *H04N 5/23212* (2013.01); *H04N 5/378* (2013.01); *G06T 2207/10148* (2013.01)

(58) Field of Classification Search
CPC .. G06T 7/80; G06T 7/73; G06T 7/571; G06T 1/0007; G06T 3/40; G06T 2207/10148; H04N 5/23212; H04N 5/378
See application file for complete search history.

(56) References Cited

U.S. PATENT DOCUMENTS

| 2008/0055430 | A1 | 3/2008 | Kirsch |
| 2015/0062422 | A1* | 3/2015 | Stern ..................... H04N 5/2254 348/374 |
| 2015/0288955 | A1 | 10/2015 | Perry et al. |
| 2016/0286108 | A1 | 9/2016 | Fettig et al. |
| 2017/0017136 | A1* | 1/2017 | Kao ........................ G03B 13/20 |

FOREIGN PATENT DOCUMENTS

WO         2014201076        12/2014

* cited by examiner

*Primary Examiner* — Huy T Nguyen
(74) *Attorney, Agent, or Firm* — Treyz Law Group, P.C.; Joseph F. Guihan

(57) ABSTRACT

Image sensors may include phase detection pixels that are used to determine the distance between the image sensor and objects in a scene. To account for variations in the angular response of phase detection pixels across a pixel array, calibration may be performed. During calibration, an image sensor may take images of targets at known distances from the sensor. The known distances may be used to determine scaling factors that account for differences between the initially calculated distances between the sensor and the targets and the actual distances between the sensor and the targets. The scaling factors may then be stored on the image sensor for future reference. During subsequent use of the image sensor, the image sensor may then obtain the appropriate scaling factor in real time for more accurate phase and distance determinations.

19 Claims, 9 Drawing Sheets

IMAGE SENSORS WITH CALIBRATED PHASE DETECTION PIXELS

BACKGROUND

This relates generally to imaging systems and, more particularly, to imaging systems with phase detection capabilities.

Modern electronic devices such as cellular telephones, cameras, and computers often use digital image sensors. Imager sensors (sometimes referred to as imagers) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Some applications such as automatic focusing and three-dimensional (3D) imaging may require electronic devices to provide stereo and/or depth sensing capabilities. For example, to bring an object of interest into focus for an image capture, an electronic device may need to identify the distances between the electronic device and object of interest. To identify distances, conventional electronic devices use complex arrangements. Some arrangements require the use of multiple image sensors and camera lenses that capture images from various viewpoints. Other arrangements require the addition of lenticular arrays that focus incident light on sub-regions of a two-dimensional pixel array. Due to the addition of components such as additional image sensors or complex lens arrays, these arrangements lead to reduced spatial resolution, increased cost, and increased complexity.

Some electronic devices include both image pixels and phase detection pixels in a single image sensor. With this type of arrangement, a camera can use the on-chip phase detection pixels to focus an image without requiring a separate phase detection sensor. However, the angular response of each phase detection pixel may vary according the position of the phase detection pixel in the pixel array. This can lead to inaccurate and inconsistent depth calculations.

It would therefore be desirable to be able to provide improved phase detection pixel arrangements for image sensors.

DETAILED DESCRIPTION

Figure 1:
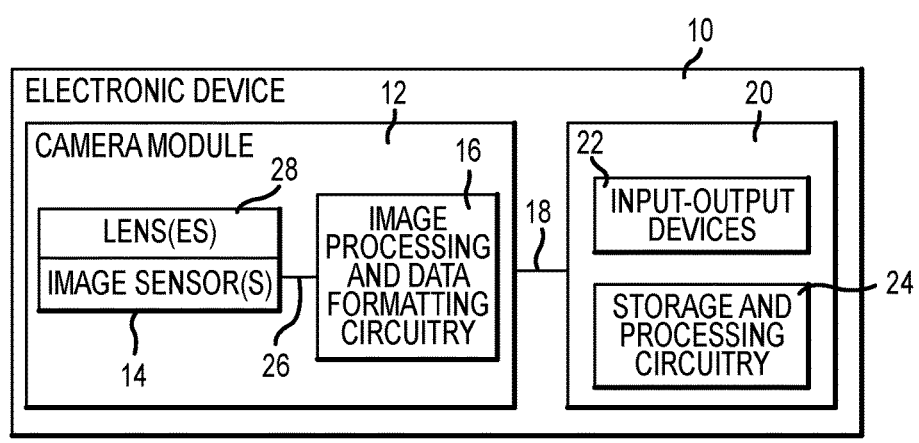
FIG. 1 is a schematic diagram of an illustrative electronic device with an image sensor that may include phase detection pixels in accordance with an embodiment.

Embodiments of the present invention relate to image sensors with automatic focusing and depth sensing capabilities. An electronic device with a camera module is shown in FIG. 1. Electronic device 10 may be a digital camera, a computer, a cellular telephone, a medical device, or other electronic device. Camera module 12 (sometimes referred to as an imaging device) may include one or more image sensors 14 and one or more lenses 28. During operation, lenses 28 (sometimes referred to as optics 28) focus light onto image sensor 14. Image sensor 14 includes photosensitive elements (e.g., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from image sensor 14 may be provided to image processing and data formatting circuitry 16. Image processing and data formatting circuitry 16 may be used to perform image processing functions such as automatic focusing functions, depth sensing, data formatting, adjusting white balance and exposure, implementing video image stabilization, face detection, etc. For example, during automatic focusing operations, image processing and data formatting circuitry 16 may process data gathered by phase detection pixels in image sensor 14 to determine the magnitude and direction of lens movement (e.g., movement of lens 28) needed to bring an object of interest into focus. Image processing and data formatting circuitry may be used to store calibration information that is used to help perform the depth sensing.

Image processing and data formatting circuitry 16 may also be used to compress raw camera image files if desired (e.g., to Joint Photographic Experts Group or JPEG format).

In a typical arrangement, which is sometimes referred to as a system on chip (SOC) arrangement, camera sensor 14 and image processing and data formatting circuitry 16 are implemented on a common integrated circuit. The use of a single integrated circuit to implement camera sensor 14 and image processing and data formatting circuitry 16 can help to reduce costs. This is, however, merely illustrative. If desired, camera sensor 14 and image processing and data formatting circuitry 16 may be implemented using separate integrated circuits. For example, camera sensor 14 and image processing circuitry 16 may be formed on separate substrates that have been stacked.

Camera module 12 may convey acquired image data to host subsystems 20 over path 18 (e.g., image processing and data formatting circuitry 16 may convey image data to subsystems 20). Electronic device 10 typically provides a user with numerous high-level functions. In a computer or advanced cellular telephone, for example, a user may be provided with the ability to run user applications. To implement these functions, host subsystem 20 of electronic device 10 may include storage and processing circuitry 24 and input-output devices 22 such as keypads, input-output ports, joysticks, and displays. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, or other processing circuits.

It may be desirable to provide image sensors with depth sensing capabilities (e.g., to use in automatic focusing applications, 3D imaging applications such as machine vision applications, etc.). To provide depth sensing capabilities, image sensor 14 may include phase detection pixel groups such as pixel pair 100 shown in FIG. 2A.

Figure 2A:
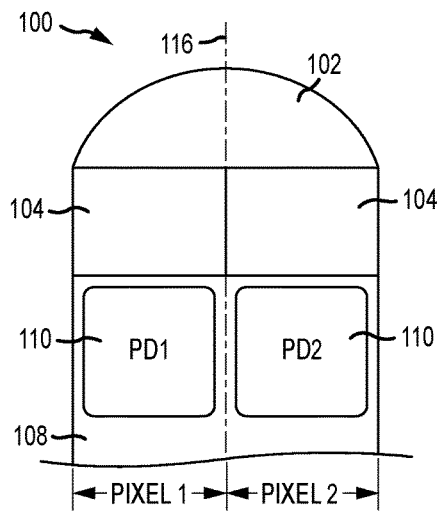
FIG. 2A is a cross-sectional view of illustrative phase detection pixels having photosensitive regions with different and asymmetric angular responses in accordance with an embodiment.

FIG. 2A is an illustrative cross-sectional view of pixel pair 100. Pixel pair 100 may include first and second pixels such as Pixel 1 and Pixel 2. Pixel 1 and Pixel 2 may include photosensitive regions 110 formed in a substrate such as silicon substrate 108. For example, Pixel 1 may include an associated photosensitive region such as photodiode PD1, and Pixel 2 may include an associated photosensitive region such as photodiode PD2. A microlens may be formed over photodiodes PD1 and PD2 and may be used to direct incident light towards photodiodes PD1 and PD2. The arrangement of FIG. 2A in which microlens 102 covers two pixel regions may sometimes be referred to as a 2×1 or 1×2 arrangement because there are two phase detection pixels arranged consecutively in a line. Microlens 102 may have a width and a length, with the length being longer than the width. Microlens 102 may have a length that is about (e.g., within 5% of) twice as long as its width. Microlens 102 may be in the shape of an ellipse with an aspect ratio of about (e.g., within 5% of) 2:1. In other embodiments, microlens 102 may be another shape such as a rectangle or another desired shape. Microlens 102 may have an aspect ratio of 1:1, less than 2:1, 2:1, greater than 2:1, greater than 3:1, or any other desired aspect ratio.

Color filters such as color filter elements 104 may be interposed between microlens 102 and substrate 108. Color filter elements 104 may filter incident light by only allowing predetermined wavelengths to pass through color filter elements 104 (e.g., color filter 104 may only be transparent to the certain ranges of wavelengths). Photodiodes PD1 and PD2 may serve to absorb incident light focused by microlens 102 and produce pixel signals that correspond to the amount of incident light absorbed.

Photodiodes PD1 and PD2 may each cover approximately half of the substrate area under microlens 102 (as an example). By only covering half of the substrate area, each photosensitive region may be provided with an asymmetric angular response (e.g., photodiode PD1 may produce different image signals based on the angle at which incident light reaches pixel pair 100). The angle at which incident light reaches pixel pair 100 relative to a normal axis 116 (i.e., the angle at which incident light strikes microlens 102 relative to the optical axis 116 of lens 102) may be herein referred to as the incident angle or angle of incidence.

The arrangement of FIG. 2A in which microlens 102 covers two pixel regions may sometimes be referred to as a 2×1 or 1×2 arrangement because there are two phase detection pixels arranged consecutively in a line. In an alternate embodiment, three phase detection pixels may be arranged consecutively in a line in what may sometimes be referred to as a 1×3 or 3×1 arrangement. In other embodiments, phase detection pixels may be grouped in a 2×2 (with four pixels covered by a single microlens) or 2×4 (with eight pixels covered by a single microlens) arrangement. In general, phase detection pixels may be arranged in any desired manner.

An image sensor can be formed using front side illumination imager arrangements (e.g., when circuitry such as metal interconnect circuitry is interposed between the microlens and photosensitive regions) or back side illumination imager arrangements (e.g., when photosensitive regions are interposed between the microlens and the metal interconnect circuitry). The example of FIGS. 2A, 2B, and 2C in which pixels 1 and 2 are backside illuminated image sensor pixels is merely illustrative. If desired, pixels 1 and 2 may be front side illuminated image sensor pixels. Arrangements in which pixels are backside illuminated image sensor pixels are sometimes described herein as an example.

Figures 2B, 2C:
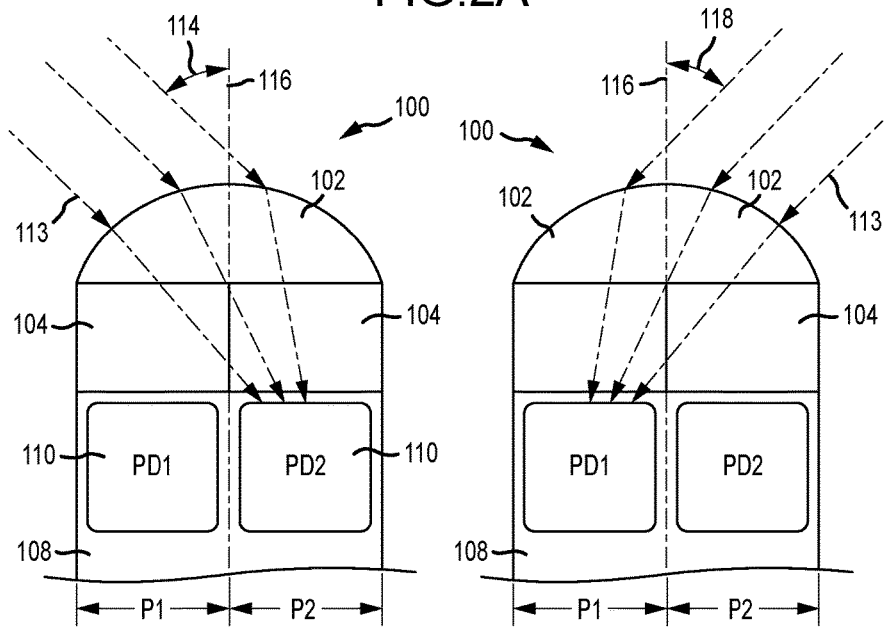
FIGS. 2B and 2C are cross-sectional views of the phase detection pixels of FIG. 2A in accordance with an embodiment.

In the example of FIG. 2B, incident light 113 may originate from the left of normal axis 116 and may reach pixel pair 100 with an angle 114 relative to normal axis 116. Angle 114 may be a negative angle of incident light. Incident light 113 that reaches microlens 102 at a negative angle such as angle 114 may be focused towards photodiode PD2. In this scenario, photodiode PD2 may produce relatively high image signals, whereas photodiode PD1 may produce relatively low image signals (e.g., because incident light 113 is not focused towards photodiode PD1).

In the example of FIG. 2C, incident light 113 may originate from the right of normal axis 116 and reach pixel pair 100 with an angle 118 relative to normal axis 116. Angle 118 may be a positive angle of incident light. Incident light that reaches microlens 102 at a positive angle such as angle 118 may be focused towards photodiode PD1 (e.g., the light is not focused towards photodiode PD2). In this scenario, photodiode PD2 may produce an image signal output that is relatively low, whereas photodiode PD1 may produce an image signal output that is relatively high.

Figure 3:
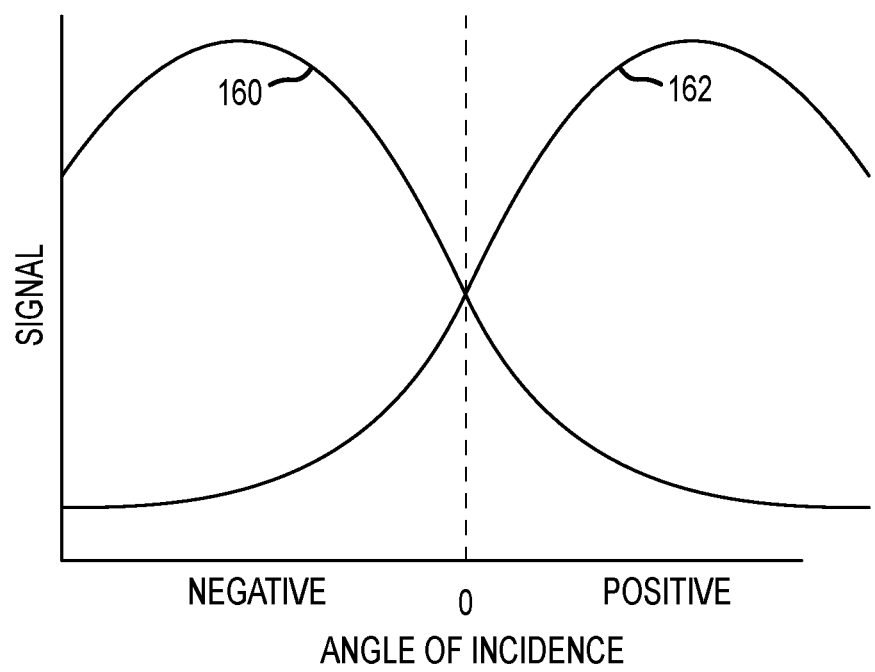
FIG. 3 is a diagram of illustrative signal outputs of phase detection pixels for incident light striking the phase detection pixels at varying angles of incidence in accordance with an embodiment.

The positions of photodiodes PD1 and PD2 may sometimes be referred to as asymmetric positions because the center of each photosensitive area 110 is offset from (i.e., not aligned with) optical axis 116 of microlens 102. Due to the asymmetric formation of individual photodiodes PD1 and PD2 in substrate 108, each photosensitive area 110 may have an asymmetric angular response (e.g., the signal output produced by each photodiode 110 in response to incident light with a given intensity may vary based on an angle of incidence). In the diagram of FIG. 3, an example of the pixel signal outputs of photodiodes PD1 and PD2 of pixel pair 100 in response to varying angles of incident light is shown.

Line 160 may represent the output image signal for photodiode PD2 whereas line 162 may represent the output image signal for photodiode PD1. For negative angles of incidence, the output image signal for photodiode PD2 may increase (e.g., because incident light is focused onto photodiode PD2) and the output image signal for photodiode PD1 may decrease (e.g., because incident light is focused away from photodiode PD1). For positive angles of incidence, the output image signal for photodiode PD2 may be relatively small and the output image signal for photodiode PD1 may be relatively large.

The size and location of photodiodes PD1 and PD2 of pixel pair 100 of FIGS. 2A, 2B, and 2C are merely illustrative. If desired, the edges of photodiodes PD1 and PD2 may be located at the center of pixel pair 100 or may be shifted slightly away from the center of pixel pair 100 in any direction. If desired, photodiodes 110 may be decreased in size to cover less than half of the pixel area.

Output signals from pixel pairs such as pixel pair 100 may be used to adjust the optics (e.g., one or more lenses such as lenses 28 of FIG. 1) in camera module 12 during automatic focusing operations. The direction and magnitude of lens movement needed to bring an object of interest into focus may be determined based on the output signals from pixel pairs 100.

For example, by creating pairs of pixels that are sensitive to light from one side of the lens or the other, a phase difference can be determined. This phase difference may be used to determine both how far and in which direction the image sensor optics should be adjusted to bring the object of interest into focus.

When an object is in focus, light from both sides of the image sensor optics converges to create a focused image. When an object is out of focus, the images projected by two sides of the optics do not overlap because they are out of phase with one another. By creating pairs of pixels where each pixel is sensitive to light from one side of the lens or the other, a phase difference can be determined. This phase difference can be used to determine the direction and magnitude of optics movement needed to bring the images into phase and thereby focus the object of interest. Pixel groups that are used to determine phase difference information such as pixel pair 100 are sometimes referred to herein as phase detection pixels or depth-sensing pixels.

A phase difference signal may be calculated by comparing the output pixel signal of PD1 with that of PD2. For example, a phase difference signal for pixel pair 100 may be determined by subtracting the pixel signal output of PD1 from the pixel signal output of PD2 (e.g., by subtracting line 162 from line 160). For an object at a distance that is less than the focused object distance, the phase difference signal may be negative. For an object at a distance that is greater than the focused object distance, the phase difference signal may be positive. This information may be used to automatically adjust the image sensor optics to bring the object of interest into focus (e.g., by bringing the pixel signals into phase with one another).

Figure 4A:
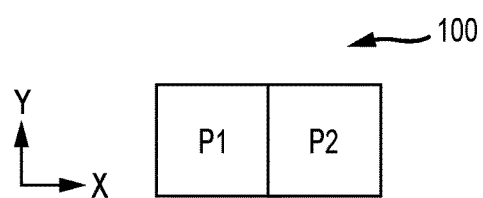
FIG. 4A is a top view of an illustrative phase detection pixel pair arranged horizontally in accordance with an embodiment.
Figure 4B:
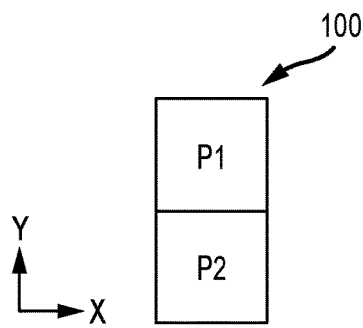
FIG. 4B is a top view of an illustrative phase detection pixel pair arranged vertically in accordance with an embodiment.
Figure 4C:
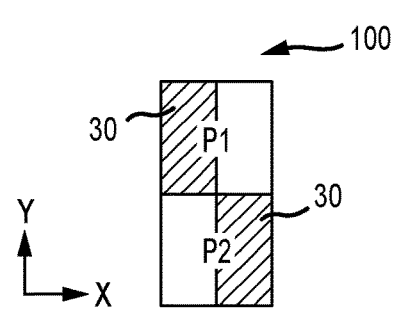
FIG. 4C is a top view of an illustrative phase detection pixel pair arranged vertically and configured to detect phase differences along the horizontal direction (e.g., across vertical edges) in accordance with an embodiment.

Pixel pairs 100 may be arranged in various ways. For example, as shown in FIG. 4A, Pixel 1 (referred to herein as P1) and Pixel 2 (referred to herein as P2) of pixel pair 100 may be oriented horizontally, parallel to the x-axis of FIG. 4A (e.g., may be located in the same row of a pixel array). In the example of FIG. 4B, P1 and P2 are oriented vertically, parallel to the y-axis of FIG. 4B (e.g., in the same column of a pixel array). In the example of FIG. 4C, P1 and P2 are arranged vertically and are configured to detect phase differences in the horizontal direction, such as from vertical edges (e.g., using an opaque light shielding layer such as metal mask 30).

Figure 5:
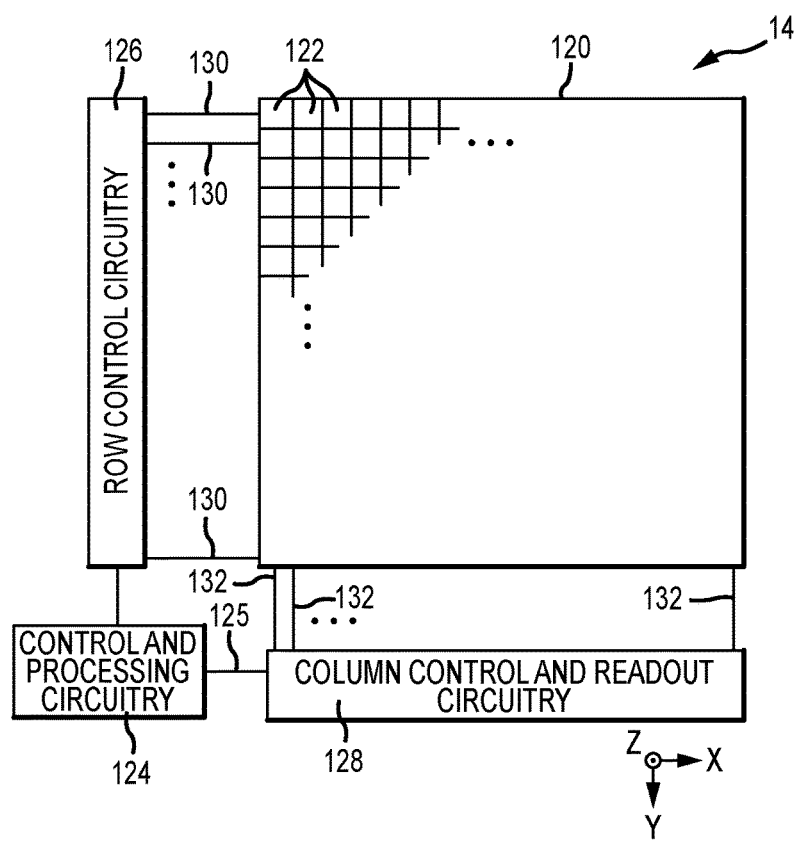
FIG. 5 is a diagram of an illustrative pixel array and associated readout circuitry for reading out image signals in an image sensor in accordance with an embodiment.

As shown in FIG. 5, image sensor 14 may include a pixel array 120 containing image sensor pixels 122 arranged in rows and columns (sometimes referred to herein as image pixels, phase detection pixels, or pixels) and control and processing circuitry 124. Array 120 may contain, for example, hundreds or thousands of rows and columns of pixels 122. Control circuitry 124 may be coupled to row control circuitry 126 and image readout circuitry 128 (sometimes referred to as column control circuitry, readout circuitry, processing circuitry, or column decoder circuitry). Row control circuitry 126 may receive row addresses from control circuitry 124 and supply corresponding row control signals such as reset, row-select, charge transfer, dual conversion gain, and readout control signals to pixels 122 over row control paths 130. One or more conductive lines such as column lines 132 may be coupled to each column of pixels 122 in array 120. Column lines 132 may be used for reading out image signals from pixels 122 and for supplying bias signals (e.g., bias currents or bias voltages) to pixels 122. If desired, during pixel readout operations, a pixel row in array 120 may be selected using row control circuitry 126 and image signals generated by image pixels 122 in that pixel row can be read out along column lines 132.

Image readout circuitry 128 may receive image signals (e.g., analog pixel values generated by pixels 122) over column lines 132. Image readout circuitry 128 may include sample-and-hold circuitry for sampling and temporarily storing image signals read out from array 120, amplifier circuitry, analog-to-digital conversion (ADC) circuitry, bias circuitry, column memory, latch circuitry for selectively enabling or disabling the column circuitry, or other circuitry that is coupled to one or more columns of pixels in array 120 for operating pixels 122 and for reading out image signals from pixels 122. ADC circuitry in readout circuitry 128 may convert analog pixel values received from array 120 into corresponding digital pixel values (sometimes referred to as digital image data or digital pixel data). Image readout circuitry 128 may supply digital pixel data to control and processing circuitry 124 and/or image processing and data formatting circuitry 16 (FIG. 1) over path 125 for pixels in one or more pixel columns.

If desired, image pixels 122 may include one or more photosensitive regions for generating charge in response to image light. Photosensitive regions within image pixels 122 may be arranged in rows and columns on array 120. Pixel array 120 may be provided with a color filter array having multiple color filter elements which allows a single image sensor to sample light of different colors. As an example, image sensor pixels such as the image pixels in array 120 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two color filters, with two green color filters diagonally opposite one another and adjacent to a red color filter diagonally opposite to a blue color filter. In another suitable example, the green color filters in a Bayer pattern are replaced by broadband color filter elements (e.g., a yellow, magenta, or clear color filter element). These examples are merely illustrative and, in general, color filter elements of any desired color and in any desired pattern may be formed over any desired number of pixels 122.

If desired, array 120 may be part of a stacked-die arrangement in which pixels 122 of array 120 are split between two or more stacked substrates. In such an arrangement, each of the pixels 122 in the array 120 may be split between the two dies at any desired node within pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any known metal-to-metal bonding technique, such as soldering or welding.

As mentioned above, the desired node in the pixel circuit that is split across the two dies may be a floating diffusion node. Alternatively, the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source-follower transistor and a row select transistor, or any other desired node of the pixel circuit.

Figure 6:
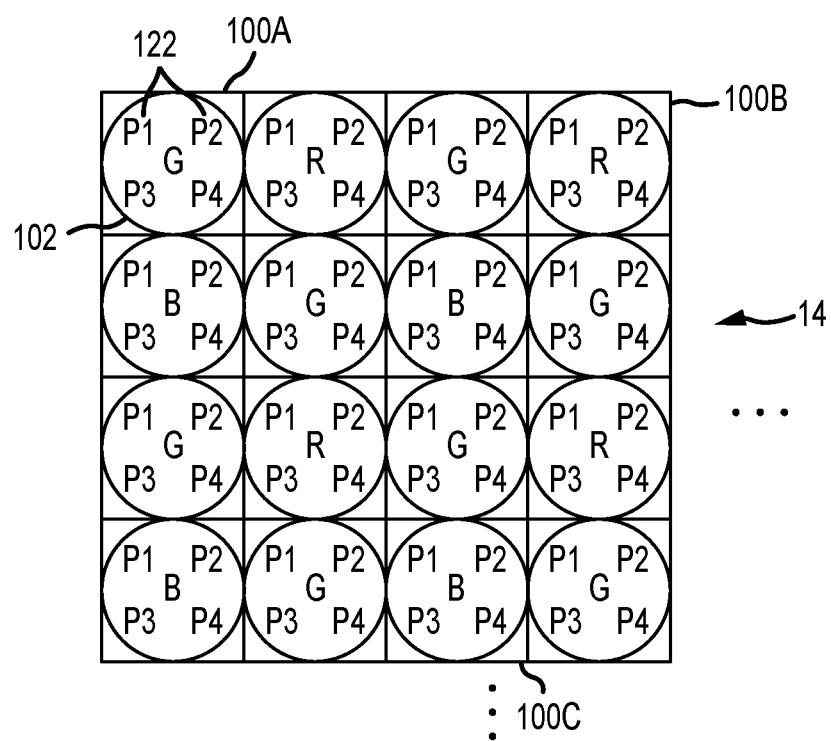
FIG. 6 is a top view of an illustrative image sensor with phase detection pixel groups that have four phase detection pixels in a 2×2 arrangement covered by a single microlens in accordance with an embodiment.

FIG. 6 is an illustrative diagram showing an image sensor 14 that may include phase detection pixel groups with multiple pixels covered by a single microlens 102. As shown, each pixel group 100 includes a number of pixels 122. In this illustrative example, each pixel group has four pixels (P1, P2, P3, and P4). Each pixel may have a respective photosensitive area. Each pixel in a respective group 100 may be covered by a color filter element of the same color. For example, pixels P1, P2, P3, and P4 in pixel group 100A may be covered by a green color filter element. Pixels P1, P2, P3, and P4 in pixel group 100B may be covered by a red color filter element. Pixels P1, P2, P3, and P4 in pixel group 100C may be covered by a blue color filter element. This example is merely illustrative. Each pixel may have a respective color filter element, multiple color filter elements may each cover multiple pixels in each pixel group 100, or a single color filter element may cover all four pixels in each pixel group 100.

Pixel group 100A may be a green pixel group formed adjacent to a blue pixel group, adjacent to a red pixel group, and diagonally opposite a second green pixel group to form a unit cell of repeating pixel groups 100. In this way, a Bayer mosaic pattern of pixel groups 100 may be created where each pixel group 100 includes four sub-pixels 122 arranged in two corresponding adjacent rows and two corresponding adjacent columns.

Forming each pixel group 100 with a single microlens 102 that covers a number of pixels 122 of the same color enables image sensor 14 to have phase detection capabilities. As shown in FIGS. 2A-2C and FIG. 3, covering multiple photodiodes with a single microlens provides the photodiodes with an asymmetric angular response to incident light. The data acquired from the pixels may then be used to obtain phase detection data. In some examples, the data acquired from two pixels in the phase detection pixel group may be compared to obtain phase detection data.

Any pair of pixels may be used to obtain phase detection data. Pixels may be used that are in the same row (e.g., P1 and P2 or P3 and P4), in the same column (e.g., P1 and P3 or P2 and P4), or diagonally opposite each other (e.g., P1 and P4 or P2 and P3). The variety of available sub-pixel combinations enables image sensor 14 to detect a variety of types of edges. Horizontally oriented phase detection pixel pairs (e.g., P1 and P2) may be better suited to detect vertical edges in a scene, whereas vertically oriented phase detection pixel pairs (e.g., P1 and P3) may be better suited to detect horizontal edges in a scene. Similarly, the sub-pixels that are diagonally opposite each other (e.g., P1 and P4 or P2 and P3) may be suited to detect diagonal edges in the scene. In certain embodiments, image sensor 14 may use image processing circuitry 16 to use the data from P1, P2, P3, and P4 to search for edges in all orientations. Additionally, because different colored pixels (e.g., red, blue, green, etc.) all have phase detection capabilities, image sensor 14 may be able to detect edges in multiple colors. This will further improve the phase detection capabilities of image sensor 14.

The arrangement of FIG. 6 results in phase detection data being obtained across the entire pixel array of the image sensor. This results in a greater quantity of phase detection data available which may result in improved phase detection. In particular, the high density of phase detection pixels may improve resolution of fine details throughout the scene. In certain applications, the phase detection data from across the entire pixel array may be used to create a depth map of the entire captured scene.

In image sensor 14 of FIG. 6, the angular response of the phase detection pixels may vary as a function of field position (e.g., the position of the phase detection pixel within the array). This may lead to different phase detection pixel groups predicting different distances for an object at the same distance from the sensor. For example, image sensor 14 may capture an image of an object that is a distance of 1 meter from the sensor. A first phase detection pixel group (e.g., in the center of the array) may correctly predict that the object is 1 meter from the sensor based on the image data. A second phase detection pixel group (e.g., in the periphery of the array) may incorrectly predict that the object is 1.5 meters from the sensor based on the image data. To avoid these errors and generate a consistent depth map across the entire image sensor, a calibration procedure may be used.

Figure 7:
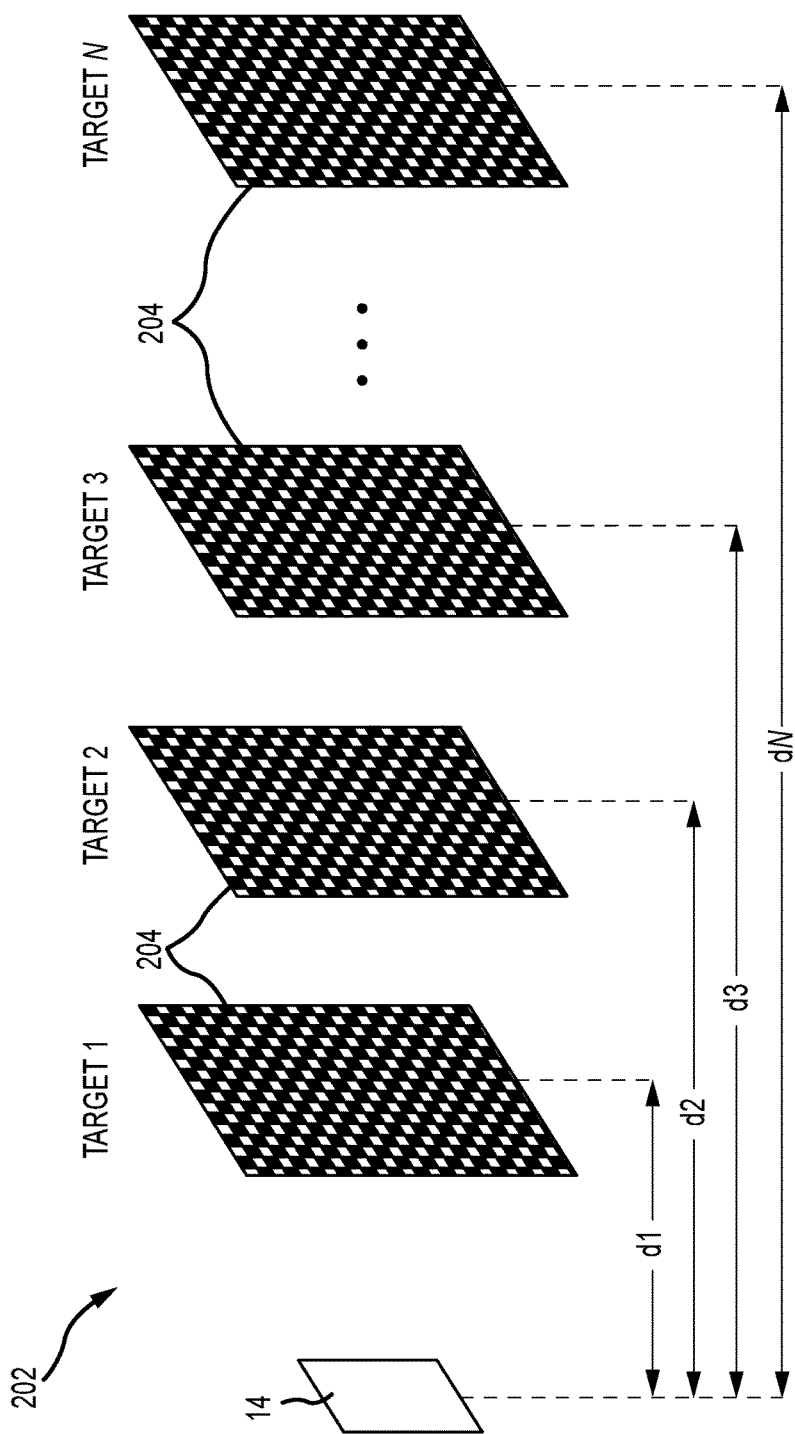
FIG. 7 is a schematic diagram of a calibration system that uses targets at different distances to determine scaling factors for phase detection pixel groups in an image sensor in accordance with an embodiment.

FIG. 7 shows a system 202 that may be used to calibrate phase detection pixels in an image sensor. As shown in in FIG. 7, image sensor 14 may be positioned to capture images of targets 204 that are known distances from the image sensor. For example, target 1 is placed a distance d1 from the image sensor, target 2 is placed a distance d2 from the image sensor, target 3 is placed a distance d3 from the image sensor, etc.

Image sensor 14 may capture an image of the target at each distance and use the captured image to determine scaling factors (sometimes referred to as calibration factors or correction factors) for each phase detection pixel group in the sensor. For example, the image sensor may capture an image of target 1 that is separated from image sensor 14 by distance d1. Consider the example where distance d1 is equivalent to 10 centimeters. Image data from a first phase detection pixel group in the image sensor may be used to calculate that the distance between the image sensor and target 1 is 10 centimeters. In this situation, the scaling factor associated with the first phase detection pixel group at 10 centimeters would be 1 (because the calculated distance is equal to the actual distance). However, image data from a second phase detection pixel group in the image sensor may be used to calculate that the distance between the image sensor and target 1 is 15 centimeters. The scaling factor for the second phase detection pixel group at 10 centimeters is therefore 0.667. The equation to determine the scaling factor is: $SF=D_{ACTUAL}/D_{CALC}$, where SF is the scaling factor, $D_{ACTUAL}$ is the actual distance between the sensor and the target, and $D_{CALC}$ is the calculated distance between the sensor and the target.

Said another way, the scaling factor accounts for the difference between the calculated distance between the sensor and the target and the actual distance between the sensor and the target (e.g., $D_{CALC} \times SF = D_{ACTUAL}$). The scaling factor may then be used to correct distance calculations in real time for improved distance determination. By determining the scaling factor associated with each phase detection pixel group using the calibration system 202, the accuracies of the depths determined by the image sensor in the field may be improved.

The scaling factor may be determined for each phase detection pixel group at multiple distances. This way, the scaling factors account for variations caused by both the position of the phase detection pixel group within the array (e.g., position along the X-axis and Y-axis) and the distance of the target from the sensor. For example, scaling factors may be determined for each phase detection pixel group using target 1 at a distance d1 from the sensor. Additionally, scaling factors may be determined for each phase detection pixel group using target 2 at a distance d2 from the sensor and scaling factors may be determined for each phase detection pixel group using target 3 at a distance d3 from the sensor. Scaling factors may be determined for each phase detection pixel group using any desired number of targets at any desired distances from the sensor. As shown in FIG. 7, a number of targets at different distances may be used up to a target N at a distance dN from the sensor.

Any desired number of targets may be used to determine the scaling factors. For example, scaling factors may be determined using three targets, four targets, five targets, eight targets, ten targets, twelve targets, fifteen targets, twenty targets, between eight targets and twelve targets, between five targets and fifteen targets, more than five targets, more than eight targets, more than ten targets, more than fifteen targets, less than fifteen targets, less than twelve targets, less than ten targets, etc. Each target may be positioned at any desired distance from the image sensor (e.g., between 10 centimeters and 1 meter from the sensor, between 5 centimeters and 5 meters from the sensor, between 5 centimeters and 10 meters from the sensor, greater than 5 centimeters from the sensor, less than 10 meters from the sensor, etc.).

Each target 204 (sometimes referred to as a calibration target, target image, or calibration target image) may have any desired appearance. In some cases, the target may have a repeating pattern with edges of different types (e.g., horizontal edges, vertical edges, and diagonal edges). Referring to each target 204 with a distinct number (e.g., target 1, target 2, target 3, . . . , target N) is merely illustrative. The same physical target may be used at each distance from the sensor if desired. Referring to the targets by different numbers is only asserting that the target (with either the same or different physical target) is at different distances from the sensor.

Thus far, the scaling factor has been described as being calculated for each phase detection pixel group at a given target distance (e.g., each phase detection pixel group 100 in FIG. 6). However, this example is merely illustrative. If desired, the scaling factor may have a lower resolution, meaning that it is applied to a larger group of phase detection pixel groups (e.g., a single scaling factor may be determined for multiple phase detection pixel groups 100 in FIG. 6). For example, multiple scaling factors may be averaged together to form a single lower resolution scaling factor. The scaling factors may have any desired resolution.

Scaling factors may be generated for each type of edge detected by the phase detection pixel group. As previously discussed in connection with FIG. 6, phase detection pixels in a phase detection pixel group may be used to detect multiple types of edges in a scene. Horizontally oriented phase detection pixel pairs (e.g., P1 and P2 or P3 and P4 in FIG. 6) may be better suited to detect vertical edges in a scene, whereas vertically oriented phase detection pixel pairs (e.g., P1 and P3 or P2 and P4 in FIG. 6) may be better suited to detect horizontal edges in a scene. Similarly pixels that are diagonally opposite each other in a first direction (e.g., P1 and P4 in FIG. 6) may be used to detect first diagonal edges while pixels that are diagonally opposite each other in a second direction that is orthogonal to the first direction (e.g., P2 and P3 in FIG. 6) may be used to detect second diagonal edges that are orthogonal to the first diagonal edges. In the example where image sensor 14 in FIG. 7 has the phase detection pixel groups of FIG. 6, calibration system 202 may therefore determine four different scaling factors for each phase detection pixel group at each target distance (one scaling factor for detecting horizontal edges, one scaling factor for detecting vertical edges, one scaling factor for detecting edges along the first diagonal, and one scaling factor for detecting edges along the second diagonal).

The scaling factors determined using the calibration system of FIG. 7 may be used to improve accuracy of an image sensor with phase detection pixels operating in real time. For example, in the field, the image sensor may apply the scaling factors (that were determined during calibration) to real-time image data to improve accuracy. The image sensor may apply the scaling factors to real-time image data in any desired manner. In one embodiment, all of the scaling factors determined during calibration may be stored in memory on the image sensor (e.g., in look-up tables). Then, when image data is obtained, the closest applicable scaling factor may be taken from the look-up tables and used to correct the calculated distance. Storing all of the scaling factors in memory on the image sensor may, however, require a large amount of memory. To reduce the amount of memory, polynomial fitting (or other desired methods) may be used to generate a function that is then used to obtain the scaling factors. In addition to reducing the amount of memory required, using a function to obtain the scaling factors may also smooth the scaling factors and increase accuracy.

Figure 8:
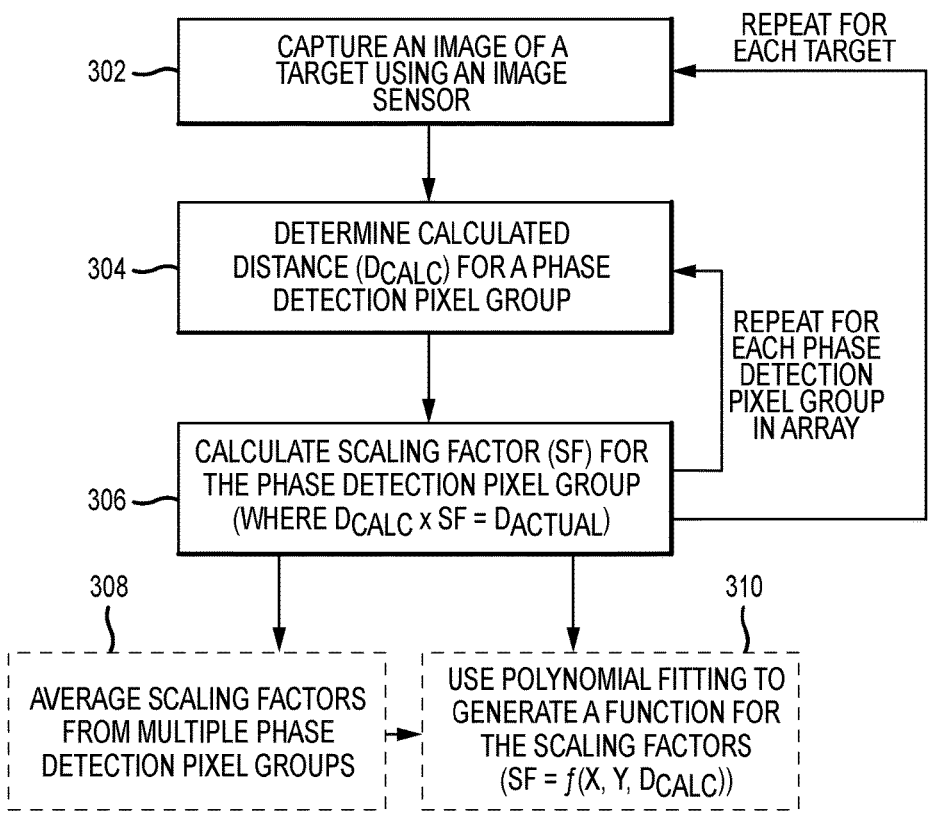
FIG. 8 is a diagram of illustrative method steps that may be used to operate a calibration system of the type shown in FIG. 7 to obtain calibration information for an image sensor with phase detection pixels in accordance with an embodiment.

FIG. 8 is a diagram of illustrative method steps that may be used to obtain calibration information for an image sensor with phase detection pixels. As shown in FIG. 8, at step 302 the image sensor may be used to capture an image of a given target (at a first known distance from the sensor). Each phase detection pixel will generate a corresponding image signal based on the amount of light received by the pixel. Next, in step 304, the image signals from a given phase detection pixel group are used to determine the calculated distance ($D_{CALC}$) between the sensor and the given target. At step 306, the scaling factor (SF) for the given phase detection pixel group is calculated based on the difference between the calculated distance (e.g., a magnitude of the calculated distance) and the known actual distance between the sensor and the given target (e.g., $SF=D_{ACTUAL}/D_{CALC}$). Steps 304 and 306 may be repeated until a scaling factor has been calculated for each phase detection pixel group in the pixel array.

After determining the scaling factor for each phase detection pixel group in the array based on the given target, steps 302, 304, and 306 may be repeated for additional targets (at different known distances from the sensor). For example, an image may be captured of an additional target that is a different distance from the image sensor than the given first target. Scaling factors may be recalculated for all of the phase detection pixel groups in steps 304 and 306 based on the new image data.

At step 308, multiple scaling factors may optionally be averaged to form a single lower resolution scaling factor, as discussed in connection with FIG. 7. The scaling factors may optionally be averaged to have any desired resolution. If no further averaging of the scaling factors is desired, step 308 may be skipped and the method may proceed directly from step 306 to step 310.

As previously discussed, all of the scaling factors may be stored in memory in the image sensor (e.g., in look-up tables). However, to decrease memory demands a function may optionally be generated during calibration that can then use the relevant variables to generate a corresponding scaling factor in real-time during image sensor operation. At step 310, polynomial fitting may be used to generate a function that is used to obtain the scaling factors. Each scaling factor that is determined in step 306 has an associated phase detection pixel group position within the array (e.g., a position X along the X-axis and a position Y along the Y-axis). Each scaling factor that is determined in step 306 also has an associated calculated distance ($D_{CALC}$). A function is therefore generated that takes the position of the phase detection pixel group (e.g., X, Y) and the calculated distance ($D_{CALC}$) from the phase detection pixel group and generates a corresponding scaling factor (e.g., SF=f(X, Y, $D_{CALC}$)).

The method described in connection with FIG. 8 may be used to determine scaling factors (and optionally a polynomial function to determine scaling factors) associated with only a single edge type. The method described in connection with FIG. 8 may therefore be repeated for additional edge types. In the example where image sensor 14 has the phase detection pixel groups of FIG. 6, steps of the method in FIG. 8 may be performed four times (once for detecting horizontal edges, once for detecting vertical edges, once for detecting edges along the first diagonal, and once for detecting edges along the second diagonal).

Once the scaling factors have been generated during calibration (e.g., as shown in FIG. 8), the image sensor may use the scaling factors to correct real time depth calculations for improved accuracy.

Figure 9:
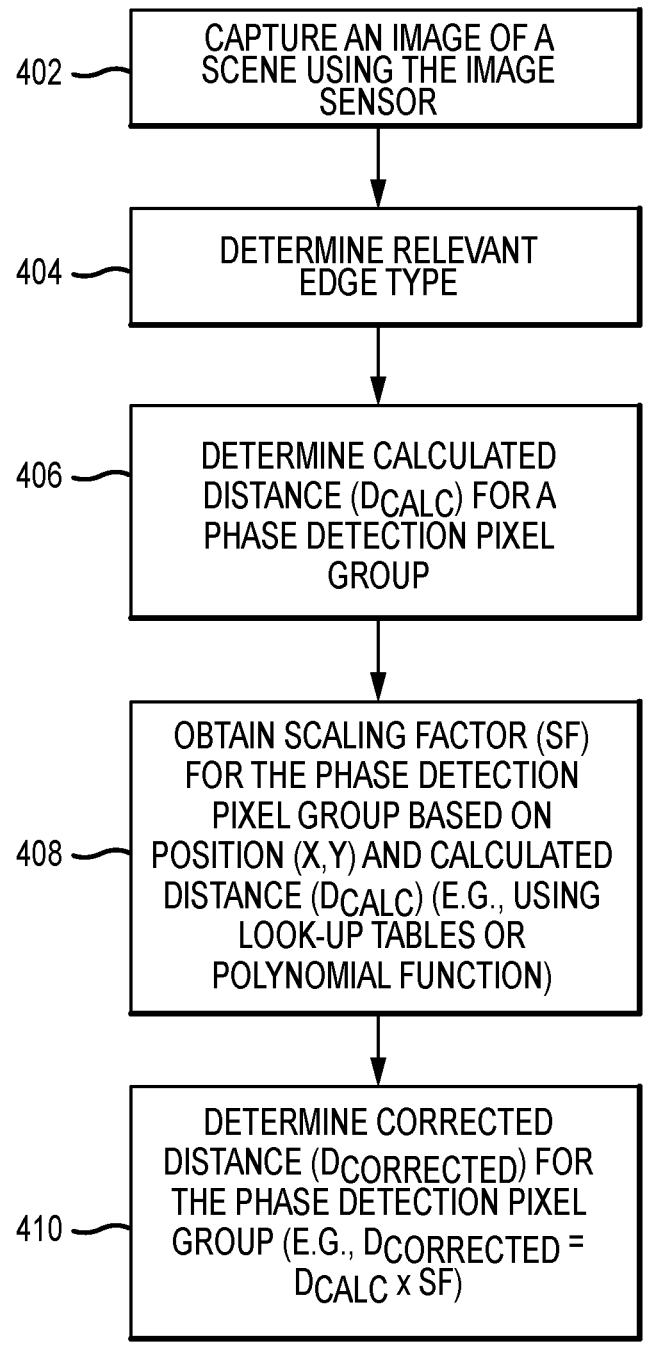
FIG. 9 is a diagram of illustrative method steps that may be used to operate an image sensor with phase detection pixels in accordance with an embodiment.

FIG. 9 is a diagram of illustrative method steps that may be used to operate an image sensor such as image sensor 14 in FIG. 1 or FIG. 6. At step 402, the image sensor may capture an image of a scene. Then, steps 404, 406, 408, and 410 may be performed for each pixel in the array. At step 404, the relevant edge type may be determined (e.g., horizontal, vertical, or diagonal). Based on the relevant edge type, image processing and data formatting circuitry in the image sensor (e.g., image processing and data formatting circuitry 16 in FIG. 1) may determine an initial calculated distance for a given phase detection pixel group at step 406. Based on the calculated distance ($D_{CALC}$) and the position (X, Y) of the phase detection pixel group, a scaling factor may be determined at step 408. The scaling factor may be determined using look-up tables or a polynomial function, as discussed above. Finally, at step 410, once the scaling factor is determined, the scaling factor may be used to correct the calculated distance into a corrected distance (e.g., $D_{CORRECTED}=SF \times D_{CALC}$). The corrected distance may then be used for additional applications (e.g., creating a depth map, automatic focusing functions, etc.).

Therefore, by calibrating an image sensor with phase detection pixels (as discussed in connection with FIGS. 7 and 8), scaling factors may be generated that may be used to correct distance calculations, thereby improving accuracy and performance of the image sensor in the field (as discussed in connection with FIG. 9).

It should be noted that the aforementioned examples of the calibration and scaling factor being based on a calculated distance is merely illustrative. To determine distance, the phase detection pixels may use a phase difference between two pixels with asymmetric angular responses to incident light. This phase difference is then used to determine the distance between the sensor and the object of interest. Therefore, the phase difference may be used as the basis for the calibration and scaling factor if desired (e.g., the scaling factor is the quotient of the phase difference that corresponds to the actual distance between target and sensor and the calculated phase difference). In general, the scaling factor may be based on and applied to any desired metric that is based on captured image data and is involved in determining a distance between the sensor and the imaged scene. A metric that is based on captured image data and is involved in determining a distance between the sensor and the imaged scene may be referred to herein as a phase metric.

In FIGS. 7-9, the phase detection pixel calibration procedure and operation of phase detection pixels using calibration information (e.g., scaling factors) was described in reference to an image sensor of the type shown in FIG. 6. However, it should be noted that the calibration system of FIG. 7 (and method of FIG. 8) may be applied to any image sensor with phase detection pixels. For example, the calibrated image sensor may have 1×2 phase detection pixel groups that are incorporated with imaging pixels (e.g., pixels with a single photodiode covered by a single microlens) in a single pixel array. The 1×2 phase detection pixel groups may be arranged in a dashed line in rows of the pixel array, as one example. Phase detection pixel groups of additional sizes (e.g., 3×3, 2×4, etc.) may also be used in the calibrated image sensor 14. Any image sensor with phase detection pixels may be calibrated and operated using the system and methods of FIGS. 7-9.

In various embodiments, a method of operating an image sensor with an array of pixels that includes phase detection pixels arranged in phase detection pixel groups includes capturing image signals using the phase detection pixels, determining a first phase metric based on the image signals from a first phase detection pixel group, and determining a scaling factor associated with the first phase metric based at least on a position of the first phase detection pixel group within the array of pixels.

The method may also include modifying the first phase metric using the scaling factor to obtain a corrected first phase metric after determining the scaling factor associated with the first phase metric. The method may also include multiplying the first phase metric by the scaling factor to obtain a corrected first phase metric after determining the scaling factor associated with the first phase metric. Determining the scaling factor associated with the first phase metric based at least on the position of the first phase detection pixel group within the array of pixels may include determining the scaling factor associated with the first phase metric based on the first phase metric and the position of the first phase detection pixel group within the array of pixels.

Determining the scaling factor associated with the first phase metric may include obtaining the scaling factor from memory in the image sensor. Obtaining the scaling factor from memory in the image sensor may include obtaining the scaling factor from a look-up table. Determining the scaling factor associated with the first phase metric may include calculating the scaling factor using a polynomial function. Calculating the scaling factor using the polynomial function may include calculating the scaling factor based on the position of the first phase detection pixel group within the array of pixels and based on the first phase metric. Determining the first phase metric may include determining the first phase metric based on a type of edge detected. The method may also include determining a respective phase metric for each phase detection pixel group in the array of pixels and determining a respective scaling factor associated with each respective phase metric.

In various embodiments, an image sensor may include phase detection pixels arranged in phase detection pixel groups that are configured to capture image signals, readout circuitry configured to read out the captured image signals from the phase detection pixels, and processing circuitry configured to receive the captured image signals from the readout circuitry, determine a phase metric for each phase detection pixel group based on the captured image signals, and for each phase detection pixel group, determine a scaling factor associated with the respective phase metric based on a position of the respective phase detection pixel group.

Determining the scaling factor associated with the respective phase metric based on the position of the respective phase detection pixel group for each phase detection pixel group may include determining the scaling factor associated with the respective phase metric based on a magnitude of the respective phase metric and the position of the respective phase detection pixel group. The processing circuitry may be further configured to for each phase detection pixel group, modify the respective phase metric using the respective scaling factor to obtain a respective corrected phase metric. The image sensor may also include memory. The processing circuitry may be configured to determine the scaling factor associated with the respective phase metric based on the position of the respective phase detection pixel group by obtaining the scaling factor from the memory. The processing circuitry may be configured to determine the scaling factor associated with the respective phase metric based on the position of the respective phase detection pixel group by calculating the scaling factor using a polynomial function.

In various embodiments, a method of obtaining calibration information for an image sensor with a plurality of phase detection pixel groups includes capturing an image of a first target that is a first distance from the image sensor using the image sensor, determining a calculated distance between the image sensor and the first target that is associated with a first phase detection pixel group of the plurality of phase detection pixel groups based on image signals captured using the image sensor, and calculating a correction factor for the first phase detection pixel group based on the calculated distance between the image sensor and the first target and the first distance between the image sensor and the first target.

Calculating the correction factor for the first phase detection pixel group based on the calculated distance between the image sensor and the first target and the first distance between the image sensor and the first target may include dividing the first distance between the image sensor and the first target by the calculated distance between the image sensor and the first target. The method may also include capturing a second image of a second target that is a second distance from the image sensor using the image sensor. The second distance may be different from the first distance. The method may also include determining a second calculated distance between the image sensor and the second target that is associated with the first phase detection pixel group of the plurality of phase detection pixel groups based on second image signals captured using the image sensor and calculating a second correction factor for the first phase detection pixel group based on the second calculated distance between the image sensor and the second target and the second distance between the image sensor and the second target.

The method may also include determining a respective calculated distance between the image sensor and the first target that is associated with the respective phase detection pixel group for each remaining phase detection pixel group of the plurality of phase detection pixel groups and calculating a respective correction factor for the respective phase detection pixel group based on the respective calculated distance between the image sensor and the first target and the first distance between the image sensor and the first target for each remaining phase detection pixel group of the plurality of phase detection pixel groups. The method may also include averaging a subset of the respective correction factors to obtain a low resolution correction factor that has a lower resolution than each of the respective correction factors.

The foregoing is merely illustrative of the principles of this invention and various modifications can be made by those skilled in the art. The foregoing embodiments may be implemented individually or in any combination.

What is claimed is:

1. A method of operating an image sensor with an array of pixels, wherein the array of pixels includes phase detection pixels arranged in phase detection pixel groups, the method comprising:
   capturing image signals using the phase detection pixels;
   based on the image signals from a first phase detection pixel group, determining a first phase metric; and
   based at least on a position of the first phase detection pixel group within the array of pixels, determining a scaling factor associated with the first phase metric; and
   after determining the scaling factor associated with the first phase metric, modifying the first phase metric using the scaling factor to obtain a corrected first phase metric.

2. The method defined in claim 1, wherein modifying the first phase metric using the scaling factor to obtain the corrected first phase metric comprises multiplying the first phase metric by the scaling factor.

3. The method defined in claim 1, wherein determining the scaling factor associated with the first phase metric based at least on the position of the first phase detection pixel group within the array of pixels comprises determining the scaling factor associated with the first phase metric based on the first phase metric and the position of the first phase detection pixel group within the array of pixels.

4. The method defined in claim 1, wherein determining the scaling factor associated with the first phase metric comprises obtaining the scaling factor from memory in the image sensor.

5. The method defined in claim 4, wherein obtaining the scaling factor from memory in the image sensor comprises obtaining the scaling factor from a look-up table.

6. The method defined in claim 1, wherein determining the scaling factor associated with the first phase metric comprises calculating the scaling factor using a polynomial function.

7. The method defined in claim 6, wherein calculating the scaling factor using the polynomial function comprises calculating the scaling factor based on the position of the first phase detection pixel group within the array of pixels and based on the first phase metric.

8. The method defined in claim 1, wherein determining the first phase metric comprises determining the first phase metric based on a type of edge detected.

9. The method defined in claim 1, further comprising:
determining a respective phase metric for each phase detection pixel group in the array of pixels; and
determining a respective scaling factor associated with each respective phase metric.

10. An image sensor comprising:
phase detection pixels arranged in phase detection pixel groups, wherein the phase detection pixels are configured to capture image signals;
readout circuitry configured to read out the captured image signals from the phase detection pixels; and
processing circuitry configured to:
receive the captured image signals from the readout circuitry;
determine a phase metric for each phase detection pixel group based on the captured image signals; and
for each phase detection pixel group, determine a scaling factor associated with the respective phase metric based on a position of the respective phase detection pixel group.

11. The image sensor defined in claim 10, wherein determining the scaling factor associated with the respective phase metric based on the position of the respective phase detection pixel group for each phase detection pixel group comprises determining the scaling factor associated with the respective phase metric based on a magnitude of the respective phase metric and the position of the respective phase detection pixel group.

12. The image sensor defined in claim 11, wherein the processing circuitry is further configured to:
for each phase detection pixel group, modify the respective phase metric using the respective scaling factor to obtain a respective corrected phase metric.

13. The image sensor defined in claim 10, further comprising:
memory, wherein the processing circuitry is configured to determine the scaling factor associated with the respective phase metric based on the position of the respective phase detection pixel group by obtaining the scaling factor from the memory.

14. The image sensor defined in claim 10, wherein the processing circuitry is configured to determine the scaling factor associated with the respective phase metric based on the position of the respective phase detection pixel group by calculating the scaling factor using a polynomial function.

15. A method of obtaining calibration information for an image sensor with a plurality of phase detection pixel groups, the method comprising:
using the image sensor, capturing an image of a first target that is a first distance from the image sensor;
based on image signals captured using the image sensor, determining a calculated distance between the image sensor and the first target that is associated with a first phase detection pixel group of the plurality of phase detection pixel groups; and
calculating a correction factor for the first phase detection pixel group based on the calculated distance between the image sensor and the first target and the first distance between the image sensor and the first target.

16. The method defined in claim 15, wherein calculating the correction factor for the first phase detection pixel group based on the calculated distance between the image sensor and the first target and the first distance between the image sensor and the first target comprises dividing the first distance between the image sensor and the first target by the calculated distance between the image sensor and the first target.

17. The method defined in claim 15, further comprising:
using the image sensor, capturing a second image of a second target that is a second distance from the image sensor, wherein the second distance is different from the first distance;
based on second image signals captured using the image sensor, determining a second calculated distance between the image sensor and the second target that is associated with the first phase detection pixel group of the plurality of phase detection pixel groups; and
calculating a second correction factor for the first phase detection pixel group based on the second calculated distance between the image sensor and the second target and the second distance between the image sensor and the second target.

18. The method defined in claim 15, further comprising:
for each remaining phase detection pixel group of the plurality of phase detection pixel groups, determining a respective calculated distance between the image sensor and the first target that is associated with the respective phase detection pixel group; and
for each remaining phase detection pixel group of the plurality of phase detection pixel groups, calculating a respective correction factor for the respective phase detection pixel group based on the respective calculated distance between the image sensor and the first target and the first distance between the image sensor and the first target.

19. The method defined in claim 18, further comprising:
averaging a subset of the respective correction factors to obtain a low resolution correction factor that has a lower resolution than each of the respective correction factors.

* * * * *